United States Patent
Robert et al.

(10) Patent No.: US 6,528,587 B2
(45) Date of Patent: Mar. 4, 2003

(54) COEXTRUSION BINDER BASED ON COGRAFTED METALLOCENE POLYETHYLENE

(75) Inventors: Patrice Robert, Beaumont le Roger (FR); Christophe Le Roy, Evreux (FR); Jerome Pascal, Saint Cyr de Salerne (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/816,662

(22) Filed: Mar. 26, 2001

(65) Prior Publication Data

US 2001/0053821 A1 Dec. 20, 2001

(30) Foreign Application Priority Data

Mar. 24, 2000 (FR) .............................................. 00 03797

(51) Int. Cl.$^7$ ......................... B32B 27/08; B32B 27/32; B65D 1/28; C09J 123/06
(52) U.S. Cl. ....................... 525/191; 525/221; 525/222; 525/232; 525/240; 525/241
(58) Field of Search ................................ 525/191, 221, 525/222, 232, 240, 241

(56) References Cited

U.S. PATENT DOCUMENTS 6,294,609 B1 * 9/2001 Bertin et al. ................ 428/523

FOREIGN PATENT DOCUMENTS

| EP | 0 742 236 A1 | 11/1996 |
| EP | 0 791 628 A1 | 8/1997 |
| EP | 0 802 207 A1 | 10/1997 |
| EP | 1 022 310 A1 | 7/2000 |
| WO | WO 97/27259 | 7/1997 |

* cited by examiner

Primary Examiner—Nathan M. Nutter
(74) Attorney, Agent, or Firm—Millen, White, Zelano & Branigan, P.C.

(57) ABSTRACT

The present invention relates to a coextrusion binder comprising:

5 to 35 parts of a polymer (A) which itself consists of a blend of 80 to 20 parts of a metallocene polyethylene (A1) of relative density between 0.865 and 0.915 and of 20 to 80 parts of a non-metallocene LLDPE polyethylene (A2), the blend of (A1) and (A2) being cografted by an unsaturated carboxylic acid;

95 to 65 parts of a polyethylene (B) chosen from ethylene homopolymers or copolymers and elastomers; the blend of (A) and (B) being such that:
  the content of grafted unsaturated carboxylic acid is between 30 and 100 000 ppm,
  the MFI or melt flow index (ASTM D 1238 standard: 190° C./2.16 kg) is between 0.1 and 10 g/10 min.

The present invention also relates to a multilayer structure.

17 Claims, No Drawings

COEXTRUSION BINDER BASED ON COGRAFTED METALLOCENE POLYETHYLENE

DESCRIPTION

The present invention relates to a coextrusion binder based on cografted metallocene polyethylene, to its use for making a multilayer structure and to the structure obtained.

The prior art EP 802 207 has already described binders based on metallocene polyethylene and on polypropylene which are cografted. In this prior art, a blend comprising at least one polyethylene and at least one polypropylene are cografted so as to compensate for the increase in viscosity of the polyethylene by the reduction in viscosity of the polypropylene due to the effect of the radical grafting initiator. This has nothing to do with the present invention, in which a blend of two polyethylenes is cografted.

The prior art WO 97/27259 describes a binder consisting of (a) a polyethylene of the HDPE, LLDPE, VLDPE or LDPE type, (b) 5 to 35% of a grafted metallocene polyethylene and (c) 0 to 35% of an elastomer, the metallocene polyethylene not being cografted.

These binders do not have sufficient hot strength—in particular, the multilayer packaging containing these binders is not good at withstanding heat treatments and thermal stresses such as, for example, pasteurization and hot welding.

The advantage of the binders of the present invention is their ability to withstand these heat treatments and the various types of thermal stresses. Another advantage of the binders of the present invention relates to their manufacture. These binders are usually made by melt grafting and melt blending, and the binder is recovered in the form of granules at the exit of an extruder or of any other equivalent device; the Applicant has found that this granulation was much easier than in the case of the binders of the above prior art.

The present invention relates to a binder comprising:

5 to 35 parts of a polymer (A) which itself consists of a blend of 80 to 20 parts of a metallocene polyethylene (A1) of relative density between 0.865 and 0.915 and of 20 to 80 parts of a non-metallocene LLDPE polyethylene (A2), the blend (A1) and (A2) being cografted by an unsaturated carboxylic acid; and 95 to 65 parts of a polyethylene (B) chosen from ethylene homopolymers or copolymers and elastomers;

the blend of (A) and (B) being such that:

the content of grafted unsaturated carboxylic acid is between 30 and $10^5$ ppm, the MFI (ASTM D 1238 standard:190° C./2.16 kg) is between 0.1 and 10 g/10 min.

According to one embodiment of the binder, the relative density of polyethylene (A2) is between 0.900 and 0.950.

According to one embodiment of the binder, the proportion of the grafting monomer is from 600 to 5000 ppm with respect to the weight of the blend of cografted A1 and A2.

According to one embodiment of the binder, the polyethylene (B) is an LLDPE of relative density between 0.910 and 0.935.

The invention also relates to a coextrusion binder consisting of a blend of 80 to 20 parts of a metallocene polyethylene (A1) of relative density between 0.865 and 0.915 and of 20 to 80 parts of a non-metallocene LLDPE polyethylene (A2), the blend of (A1) and (A2) being cografted by an unsaturated carboxylic acid; the blend of (A1) and (A2) being such that:

the content of grafted unsaturated carboxylic acid is between 30 and $10^5$ ppm;

the MFI or melt flow index (ASTM D 1238 standard: 190° C./2.16 kg) is between 0.1 and 10 g/10 minutes.

The expression "unsaturated carboxylic acid" is intended to include functional derivatives as explained below.

The subject of the invention is also a multilayer structure comprising a layer which comprises the binder of any one of the preceding claims and, directly attached to the said layer, a layer (E):

of a nitrogen-containing or oxygen-containing polar resin, such as a polyamide resin, an aliphatic polyketone resin, a saponified ethylene/vinyl acetate copolymer resin (EVOH) or a polyester resin; or of metal.

According to an embodiment of the structure, there is directly attached to the latter, on the binder side, either a polyolefin layer (F) or a layer of a resin chosen from the resins of the layer (E), or else a metal layer.

The subject of the invention is also a rigid hollow body consisting of a structure as defined above.

The invention also relates to a structure comprising a layer of polyolefin (F), a layer of the binder defined above, a layer of a polyamide resin or of a saponified ethylene/vinyl acetate copolymer (EVOH), a layer of the binder defined above and a layer of polyolefin (F), respectively.

These structures are useful for manufacturing flexible or rigid packaging, such as sachets, bottles or containers. Such packaging can be manufactured by coextrusion, lamination or coextrusion-blow molding.

The invention is also useful for coextruded hoses or pipes and for multilayer fuel tanks for motor vehicles.

The invention will now be described in detail.

With regard to (A1), the term "metallocene polyethylene" is understood to mean the polymers obtained by copolymerizing ethylene with an alpha-olefin, such as propylene, butene, hexene or octene for example, in the presence of a monosite catalyst generally consisting of an atom of a metal which may, for example, be zirconium or titanium and of two cyclic alkyl molecules attached to the metal. More specifically, the metallocene catalysts are usually composed of two cyclopentadiene rings attached to the metal. These catalysts are frequently used with aluminoxanes as cocatalysts or activators, preferably methylaluminoxane (MAO). Hafnium can also be used as the metal to which the cyclopentadiene is attached. Other metallocenes may include transition metals of Groups IVA, VA and VIA. Metals from the series of lanthanides can also be used.

These metallocene polyethylenes may also be characterized by their ratio $\overline{M_w}/\overline{M_n}<3$ and preferably $<2$, in which $\overline{M_w}$ and $\overline{M_n}$ denote the weight-average molar mass and the number-average molar mass, respectively. Also termed metallocene polyethylene are polymers having an MFR (melt flow ratio) of less than 6.53 and a ratio $\overline{M_w}/\overline{M_n}$ greater than the MFR less 4.63. MFR denotes the ratio of the $MFI_{10}$ (the MFI under a load of 10 kg) to the $MFI_2$ (the MFI under a load of 2.16 kg). Other metallocene polyethylenes are defined by an MFR equal to or greater than 6.13 and an $\overline{M_w}/\overline{M_n}$ ratio of less than or equal to the MFR less 4.63.

Advantageously, the relative density of (A1) is between 0.870 and 0.900.

With regard to polyethylene (A2), this is an ethylene/alpha-olefin copolymer of the LLDPE (linear low-density polyethylene) type which is not of metallocene origin. The alpha-olefins advantageously have from 3 to 30 carbon atoms.

Examples of alpha-olefins having 3 to 30 carbon atoms as possible comonomers comprise propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene and 1-triacontene. These alpha-olefins may be used by themselves or as a blend of two or more of them.

The relative density of (A2) is advantageously between 0.900 and 0.950. The MFI of (A2) is between 0.1 and 8 g/10 min. (190° C./2.16 kg).

The blend of (A1) and (A2) is grafted with an unsaturated carboxylic acid, that is to say (A1) and (A2) are cografted. It would not be outside the scope of the invention to use a functional derivative of this acid.

Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of unsaturated carboxylic acids.

Unsaturated dicarboxylic acids having 4 to 10 carbon atoms and their functional derivatives, particularly their anhydrides, are particularly preferred grafting monomers.

These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo-[2.2.1]hept-5-ene-2,3-dicarboxylic and x-methyl-bicyclo[2.2.1]hept-5-ene-2,2-dicarboxylic anhydrides.

Examples of other grafting monomers comprise $C_1$–$C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids, such as acrylamide, methacrylamide, the monoamide of maleic acid, the diamide of maleic acid, the N-monoethylamide of maleic acid, the N,N-diethylamide of maleic acid, the N-monobutylamide of maleic acid, the N,N-dibutylamide of maleic acid, the monoamide of fumaric acid, the diamide of fumaric acid, the N-mono-ethylamide of fumaric acid, the N,N-diethylamide of fumaric acid, the N-monobutylamide of fumaric acid and the N,N-dibutylamide of fumaric acid; imide derivatives of unsaturated carboxylic acids, such as maleimide, N-butylmaleimide and N-phenylmaleimide; and metal salts of unsaturated carboxylic acids, such as sodium acrylate, sodium methacrylate, potassium acrylate and potassium methacrylate. Maleic anhydride is preferred.

Various known processes may be used to graft a grafting monomer onto the blend of (A1) and (A2). The blend may contain the additives normally used when processing polyolefins, having contents of between 10 ppm and 5%, such as antioxidants based on substituted phenolic molecules, UV stabilizers, processing aids such as fatty amides, stearic acid and its salts, fluoropolymers known as agents for preventing extrusion defects, amine-based antifogging agents, antiblocking agents such as silica or talc, masterbatches with colorants, nucleating agents, inter alia.

For example, this may be carried out by heating the polymers (A1) and (A2) to high temperatures, approximately 150 to approximately 300° C., in the presence or absence of a solvent and with or without a radical initiator. Suitable solvents that may be used in this reaction are benzene, toluene, xylene, chlorobenzene, cumene, inter alia. Suitable radical initiators which can be used comprise tert-butyl hydroperoxide, cumene hydroperoxide, diisopropylbenzene hydroperoxide, di-tert-butyl peroxide, tert-butylcumyl peroxide, dicumyl peroxide, 1,3-bis(tert-butylperoxyisopropyl)-benzene, acetyl peroxide, benzoyl peroxide, isobutyryl peroxide, bis(3,5,5-trimethylhexanoyl) peroxide and methyl ethyl ketone peroxide.

The amount of grafting monomer in the blend of (A1) and (A2) modified by the grafting obtained in the abovementioned manner may be chosen in an appropriate manner, but it is preferably from 0.01 to 10%, better still from 600 ppm to 5000 ppm, with respect to the weight of grafted (A1) and (A2).

The amount of grafted monomer is determined by assaying the succinic functional groups by FTIR spectroscopy. The MFI of (A), that is to say of (A1) and (A2) which have been cografted, is advantageously between 0.1 and 10.

As regards polyethylene (B), this is an ethylene homopolymer or a copolymer of ethylene with a monomer chosen from alpha-olefins, esters of unsaturated carboxylic acids or vinyl esters of saturated carboxylic acids. The alpha-olefins were defined above. The esters of unsaturated carboxylic acids are, for example, alkyl (meth)acrylates, the alkyl of which has 1 to 24 carbon atoms. Examples of alkyl acrylates or methacrylates that can be used are, in particular, methyl methacrylate, ethyl acrylate, n-butyl acrylate, isobutyl acrylate and 2-ethylhexyl acrylate. The vinyl esters of saturated carboxylic acids are, for example, vinyl acetate or vinyl propionate. (B) may be an HDPE, LDPE, LLDPE or VLDPE polyethylene or a metallocene PE.

(B) may also be a polymer having an elastomeric character, that is to say it may be (i) an elastomer within the meaning of ASTM D412, which means a material which can be stretched at room temperature to twice its length, held in this way for 5 minutes and then can return to within less than 110% of its initial length after having been released, or (ii) a polymer which does not exactly have the above characteristics but which can be stretched and can return to approximately its initial length. By way of example, mention may be made of:

EPRs (ethylene-propylene rubbers, also called EPMs) and EPDMs (ethylene-propylene-diene terpolymers);

styrene elastomers, such as SBRs (styrene/butadiene rubbers), styrene/butadiene/styrene block copolymers (SBS), styrene/ethylene-butylene/styrene block copolymers (SEBS) and styrene/isoprene/styrene block copolymers (SIS).

Advantageously, (B) is an LLDPE polyethylene having a relative density of between 0.910 and 0.935 or else an HDPE having a relative density of between 0.935 and 0.950.

Advantageously, the proportions of (A) and (B) are 10 to 30 parts of (A) per 90 to 70 parts of (B), respectively.

According to a second embodiment, the invention relates to a composition consisting of a single blend of cografted (A1) and (A2) which is intended to be diluted in a polyethylene or an elastomer (B). The Applicant has in fact discovered that it is possible to adjust the concentration of the final binder (i.e. blend of (A) and (B)) according to the various uses starting from (A) by compounding or blending of granules with (B).

The binders of the invention are used for multilayer structures such as, for example, films, sheets, tubing and hollow bodies such as fuel tanks.

The multilayer structure of the present invention includes the layer comprising the above binder and a layer (E) of oxygen-containing or nitrogen-containing polar resin, or a metal layer.

Examples of preferred polar resins in the layer other than the binder are polyamide resins, an aliphatic polyketone, a saponified ethylene/vinyl acetate copolymer and polyesters.

More specifically, they comprise long-chain synthetic polyamides having structural units of the amide group in the main chain, such as PA-6, PA-6,6, PA-6,10, PA-11, PA-6/6,6 and PA-12; a saponified ethylene/vinyl acetate copolymer having a degree of saponification of approximately 90 to 100 mol %, obtained by saponifying an ethylene/vinyl acetate copolymer having an ethylene content of approximately 15 to 60 mol %; polyesters such as polyethylene terephthalate, polybutylene terephthalate and polyethylene naphthenate, blends of these resins, or else aromatic polyesters such as liquid-crystal polymers.

The metal layer may, for example, be a sheet, a film or a foil of a metal such as aluminium, iron, copper, tin and nickel or an alloy containing at least one of these metals as the main constituent. The thickness of the film or of the foil may be suitably chosen and is, for example, approximately 0.01 to approximately 0.2 mm. It is common practice to degrease the surface of the metal layer before laminating the binder of the invention to it. The layer of oxygen-containing or nitrogen-containing polar resin (E) may also contain known additives in conventional amounts.

The invention also relates to a structure comprising a polyolefin layer (F), a layer of the binder of the invention and either a layer (E) of nitrogen-containing or oxygen-containing polar resin or a metal layer, respectively.

The various layers of the structures of the invention may contain additives such as fillers, stabilizers, slip agents, antistatic agents and fire retardants.

The structures of the invention may be manufactured by coextrusion and extrusion-blow molding processes known in the field of thermoplastics.

EXAMPLES

In the foregoing and in the following examples, all temperatures are set forth uncorrected in degrees Celsius; and, unless otherwise indicated, all parts and percentages are by weight.

In the following examples, the grafting monomer is maleic anhydride (MAH).

In Table 1, the comonomer content in A1 is 25% (weight) and ethylene is 75% by weight. The comonomer content in A2 is 5% (weight) and ethylene is 95%. In Table 2, the comonomer content in A1 is 15% (weight) and ethylene is 85%. The comonomer content in A2 is 2% (weight) and ethylene is 98%.

In Table I, the comonomer content in B is 7% (weight) and ethylene is 93%. In Table 2, the comonomer content in B is 5% (weight) and ethylene is 95%. (In general, for both metallocene and LLDPE, the content by weight of the comonomers are at least 60% ethylene and up to 40% comonomer.)

Tables 1 and 2 below give the compositions of binders, the percentages being percentages by weight.

Comparing the peel force values in Table 1, it may be seen that Example 4, according to the invention, has better adhesive properties at 23° C. than Comparative Examples 2 and 3 and adhesive properties which are the same or better than the adhesive properties of Comparative Examples 1 to 3 in a temperature range from 50 to 90° C.

Comparing the peel force values in Table 2, it may be seen that Example 8, according to the invention, has better adhesive properties at 23° C. and 50° C. than Comparative Examples 6 and 7 and better adhesive properties than the adhesive properties of Comparative Examples 5 to 7 in a temperature range from 70 to 90° C.

It may be concluded that cografting a blend of the two types of PE (metallocene and non-metallocene) makes it possible, by synergy, to improve the adhesive properties of the binders.

TABLE 1

|  |  | Comparative Example 1 | Comparative Example 2 | Comparative Example 3 | Example 4 |
|---|---|---|---|---|---|
| Polymer (A) |  | Grafted A1 alone | Grafted A2 alone | Grafted A1 alone + grafted A2 alone | Cografted A1 + A2 |
|  | Type of PE | Metallocene | LLDPE | (Metallocene) + (LLDPE) | (Metallocene) + (LLDPE) |
|  | Relative density | 0.870 | 0.920 | (0.870) + (0.920) | (0.870 + 0.920) |
|  | Comonomer | 1-octene | 1-butene | (1-octene) + (1-butene) | (1-octene + 1-butene) |
|  | Composition | 100% A1 | 100% A2 | (50% A1) + (50% A2) | (50% A1 + 50% A2) |
|  | Degree of grafting | 0.6% | 0.7% | 0.65% | 0.7% |
|  | MFI (g/10 min.) 190° C./2.16 kg | 2.0 | 0.5 | 1.1 | 1.2 |
|  | Proportion of (A) | 15% | 15% | 15% | 15% |
| Polyethylene B | Type of PE | LLDPE | LLDPE | LLDPE | LLDPE |
|  | Comonomer | 1-butene | 1-butene | 1-butene | 1-butene |
|  | Relative density | 0.910 | 0.910 | 0.910 | 0.910 |
|  | Proportion of (B) | 85% | 85% | 85% | 85% |
| Peel strength* (N/15 mm) | T = 23° C. | 12.0 | 8.5 | 9.2 | 11.5 |
|  | T = 50° C. | 8.3 | 4.8 | 5.6 | 8.3 |
|  | T = 70° C. | 6.2 | 3.0 | 3.8 | 6.9 |
|  | T = 80° C. | 4.2 | 2.2 | 2.9 | 6.0 |
|  | T = 90° C. | 0 | 0.8 | 0.8 | 4.1 |

*Peel test carried out between binder layer and EVOH layer in a coextruded film comprising 5 layers (PE/binder/EVOH/binder/PE, where the PE has a relative density of 0.935 and the EVOH contains 38% ethylene), having thicknesses in μm of 80/10/10/10/80, respectively, at a temperature T and at a peel rate of 200 mm/min.

TABLE 2

|  |  | Comparative Example 5 | Comparative Example 6 | Comparative Example 7 | Example 8 |
|---|---|---|---|---|---|
| Polymer (A) |  | Grafted A1 alone | Grafted A2 alone | Grafted A1 alone + grafted A2 alone | Cografted A1 + A2 |
|  | Type of PE | metallocene | LLDPE | (Metallocene) + (LLDPE) | (Metallocene) + (LLDPE) |
|  | Relative density | 0.890 | 0.930 | (0.890) + (0.930) | (0.890 + 0.930) |
|  | Comonomer | 1-octene | 1-butene | (1-octene) + (1-butene) | (1-octene + 1 butene) |
|  | Composition | 100% A1 | 100% A2 | (50% A1) + (50% A2) | (50% A1 + 50% A2) |
|  | Degree of grafting | 0.8% | 0.7% | 0.75% | 0.7% |
|  | MFI (g/10 min.) 190° C./2.16 kg | 1.0 | 0.7 | 0.8 | 0.9 |
|  | Proportion of (A) | 15% | 15% | 15% | 15% |
| Polyethylene (B) | Type of PE | LLDPE | LLDPE | LLDPE | LLDPE |
|  | Comonomer | 1-butene | 1-butene | 1-butene | 1-butene |
|  | Relative density | 0.920 | 0.920 | 0.920 | 0.920 |
|  | Proportion of (B) | 85% | 85% | 85% | 85% |
| Peel strength* (N/15 mm) | T = 23° C. | 13.1 | 3.5 | 5.8 | 13.0 |
|  | T = 50° C. | 9.4 | 3.2 | 4.6 | 9.2 |
|  | T = 70° C. | 7.0 | 2.9 | 3.4 | 7.6 |
|  | T = 80° C. | 5.0 | 2.4 | 2.6 | 6.2 |
|  | T = 90° C. | 1.2 | 1.3 | 1.2 | 4.3 |

*Peel test carried out between binder layer and EVOH layer in a coextruded film comprising 5 layers (PE/binder/EVOH/binder/PE, where the PE has a relative density of 0.935 and the EVOH contains 38% ethylene), having thicknesses in μm of 80/10/10/10/80, respectively, at a temperature T and at a peel rate of 200 mm/min.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/03.797, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions. For example, inasmuch as polymer (A) is novel and useful by itself, it constitutes an aspect of the invention.

What is claimed is:

1. A coextrusion binder comprising:
   5 to 35 parts of a polymer (A) comprising a blend of 80 to 20 parts of a metallocene polyethylene (A1) of relative density between 0.865 and 0.915 and of 20 to 80 parts of a non-metallocene LLDPE polyethylene (A2), the blend of (A1) and (A2) being cografted by a cografting monomer said cografting monomer being an unsaturated carboxylic acid grafting monomer or functional acid derivative thereof, and
   95 to 65 parts of (B) selected from the group consisting of at least one of an ethylene homopolymer; an ethylene copolymer wherein the comonomer is (a) an alpha-olefin, (b) an ester of an unsaturated carboxylic acid or (c) a vinyl ester of a saturated carboxylic acid; and a hydrocarbon elastomeric copolymer;
   the blend of (A) and (B) being such that:
   the content of cografting monomer is between 30 and $10^5$ ppm,
   the MFI or melt flow index (ASTM D 1238 standard: 190° C./2.16 kg) is between 0.1 and 10 g/10 min.

2. A binder according to claim 1, wherein the relative density of polyethylene (A2) is between 0.900 and 0.950.

3. A coextrusion binder comprising a blend of 80 to 20 parts of a metallocene polyethylene (A1) having a relative density of between 0.865 and 0.915 and of 20 to 80 parts of a non-metallocene LLDPE polyethylene (A2), the blend of (A1) and (A2) being cografted by a cografting monomer, said cografting agent being an unsaturated carboxylic acid or functional acid derivative thereof;
the blend of (A1) and (A2) being such that:
   the content of cografting monomer is between 30 and $10^5$ ppm;
   the MFI or melt flow index (ASTM D 1238 standard: 190° C./2.16 kg) is between 0.1 and 10 g/10 min.

4. A binder according to claim 1, in which the proportion of the cografting monomer is from 600 to 5 000 ppm with respect to the weight of the blend of cografted (A1) and (A2).

5. A binder according to claim 1, in which the polyethylene (B) is an LLDPE having a relative density of between 0.910 and 0.935.

6. A binder according to claim 2, in which the proportion of the grafting monomer is from 600 to 5 000 ppm with respect to the weight of the blend of cografted (A1) and (A2).

7. A binder according to claim 6, in which the polyethylene (B) is an LLDPE having a relative density of between 0.910 and 0.935.

8. A binder according to claim 1, wherein the cografting monomer is a dicarboxylic acid.

9. A binder according to claim 3, wherein the cografting monomer is a dicarboxylic acid.

10. A binder according to claim 7, wherein the cografting monomer is a dicarboxylic acid.

11. A binder according to claim 1, wherein the cografting monomer is maleic anhydride.

12. A binder according to claim 3, wherein the cografting monomer is maleic anhydride.

13. A binder according to claim 7, wherein the cografting monomer is maleic anhydride.

14. A coextrusion binder according to claim 1, wherein (B) copolymer of LLDPE is a 1-olefin.

15. A coextrusion binder according to claim 14, wherein the LLDPE is a copolymer of ethylene with 1-octene.

16. A coextrusion binder according to claim 3, wherein the LLDPE is a copolymer of ethylene with 1-octene.

17. A coextrusion binder consisting essentially of:

5 to 35 parts of a polymer (A) comprising a blend of 80 to 20 parts of a metallocene polyethylene (A1) of relative density between 0.865 and 0.915 and of 20 to 80 parts of a non-metallocene LLDPE polyethylene (A2), the blend of (A1) and (A2) being cografted by a cografting monomer said cografting monomer being an unsaturated carboxylic acid grafting monomer or functional acid derivative thereof, and 95 to 65 parts of (B) selected from the group consisting of at least one of an ethylene homopolymer; an ethylene copolymer wherein the comonomer is (a) an alpha-olefin, (b) an ester of an unsaturated carboxylic acid or (c) a vinyl ester of a saturated carboxylic acid; and a hydrocarbon elastomeric copolymer;

the blend of (A) and (B) being such that:

the content of cografting monomer is between 30 and $10^5$ ppm, the MFI or melt flow index (ASTM D 1238 standard: 190° C./2.16 kg) is between 0.1 and 10 g/10 min.

* * * * *